(12) United States Patent
Malmgren

(10) Patent No.: US 6,314,082 B1
(45) Date of Patent: Nov. 6, 2001

(54) BROADCAST NETWORK SELECTION TECHNIQUES FOR RADIOCOMMUNICATION SYSTEMS

(75) Inventor: Göran Malmgren, Hägerstein (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 08/968,122

(22) Filed: Nov. 17, 1997

(51) Int. Cl.⁷ .................. H04J 11/00; H04B 7/212; H04Q 7/20; H03D 1/04
(52) U.S. Cl. .................. 370/208; 370/343; 370/347; 370/487; 375/346; 455/426
(58) Field of Search ...................... 370/208, 210, 370/328, 343, 344, 347, 365, 480, 503, 332, 334; 375/346, 154, 364; 455/38.3, 426, 422, 450, 62, 63, 70, 188, 187, 270, 186, 503, 103, 104, 509

(56) References Cited

U.S. PATENT DOCUMENTS

| | | | |
|---|---|---|---|
| 5,228,025 | * | 7/1993 | Le Floch et al. .................. 370/20 |
| 5,499,386 | * | 3/1996 | Karlsson .................. 455/33.2 |
| 5,544,198 | * | 8/1996 | Saalfrank .................. 375/260 |
| 5,574,983 | * | 11/1996 | Couzono et al. .................. 455/69 |
| 5,732,113 | * | 3/1998 | Schmidl et al. .................. 375/355 |
| 5,822,324 | * | 10/1998 | Kostresti et al. .................. 370/487 |
| 5,905,718 | * | 4/1999 | Kurokami et al. .................. 370/328 |
| 5,933,192 | * | 8/1999 | Crosby et al. .................. 348/387 |
| 5,949,796 | * | 9/1999 | Kumar .................. 370/529 |
| 5,953,311 | * | 9/1999 | Davies et al. .................. 370/210 |
| 5,956,642 | * | 9/1999 | Larsson et al. .................. 455/449 |
| 6,038,434 | * | 3/2000 | Miyake .................. 455/186.1 |

FOREIGN PATENT DOCUMENTS

| | | |
|---|---|---|
| 19630195 | 11/1997 | (DE). |
| WO 92/16063 | * 9/1992 | (EP). |
| 565470 | 10/1993 | (EP). |
| 689307 | 12/1995 | (EP). |
| WO96/28904 | 9/1996 | (WO). |
| WO97/02670 | 1/1997 | (WO). |
| WO97/15159 | 4/1997 | (WO). |

OTHER PUBLICATIONS

European Telecommunication Standard "Radio Broadcasting Systems; Digital Audio Broadcasting (DAB) to mobile, portable and fixed recievers", ETS 3300401, Second Edition, May 1997 (entire document).

Göran Malmgren, *Single Frequency Broadcasting Networks*, dissertation submitted to the Royal Institute of Technology, Apr. 1997 (entire document).

Per Erik Gunnarsson, Teracom, *Reciever Location Estimation using DAB*, Master Thesis draft 3.2, Royal Institute of Technology, Aug. 1997 (entire document).

Gregory P. Pollini, "Trends in Handover Design", Topics in Lightwave, IEEE Communications Magazine, pp. 82–90, Mar. 1996.

* cited by examiner

Primary Examiner—Alpus H. Hsu
Assistant Examiner—Duc Ho
(74) Attorney, Agent, or Firm—Burns, Doane, Swecker & Mathis, L.L.P.

(57) ABSTRACT

Hybrid cellular/broadcast systems are described wherein broadcast (simulcast) techniques are used to provide high data rate, downlink radiocommunication service. Various techniques for selecting an optimal broadcast networks, from a plurality of potential networks, are discussed. Parameters used in these selection techniques are estimated to reduce calculation complexity.

28 Claims, 4 Drawing Sheets

BROADCAST NETWORK SELECTION TECHNIQUES FOR RADIOCOMMUNICATION SYSTEMS

BACKGROUND

The present invention relates generally to radio communication systems and, more specifically, to methods and systems for selecting a broadcast network from which to receive data in such systems.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Throughout the world, one important step in the advancement of radio communication systems is the change from analog to digital transmission. Equally significant is the choice of an effective digital transmission scheme for implementing the next generation technology. Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure. Important features desired in these new systems are increased traffic capacity and the ability to communicate at much higher data rates than today's systems were designed to support.

Currently, channel access in cellular systems is primarily achieved using Frequency Division Multiple Access (FDMA) and Time Division Multiple Access (TDMA) methods. In FDMA, a communication channel is a single radio frequency band into which a signal's transmission power is concentrated. Signals which can interfere with a communication channel include those transmitted on adjacent channels (adjacent channel interference) and those transmitted on the same channel in other cells (co-channel interference). Interference with adjacent channels is limited by the use of band pass filters which only pass signal energy within the specified frequency band. Co-channel interference is reduced to tolerable levels by restricting channel re-use by providing a minimum separation distance between cells in which the same frequency channel is used. Thus, with each channel being assigned a different frequency, system capacity is limited by the available frequencies as well as by limitations imposed by channel reuse. FDMA was used for channel access in first generation systems such as AMPS.

In TDMA systems, a channel consists of, for example, a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, with each channel being assigned a different time slot, system capacity is limited by the available time slots as well as by limitations imposed by channel reuse as described above with respect to FDMA.

As information technologies and communication technologies continue to grow closer together, demand for high data rate support (e.g., greater than 56 kbit/s) is rapidly increasing, particularly with the advent of the Internet and the desire to transmit video information. Existing radiocommunication systems were not designed to handle such high data rates.

One type of system that is being considered to accommodate the demand for high data rates is a hybrid system in which high data rates are supported in the downlink (i.e., the base-to-mobile direction) and lower data rates are supported in the uplink (i.e., mobile- to-base direction). For example, it has been proposed that such a hybrid system could be provided wherein cellular technology system is used to support uplink traffic channels, low data rate downlink traffic channels and control channels (uplink and downlink), while a broadcast transmission system is used to support high data rate, downlink traffic channels. In particular, the broadcast system known as the Digital Audio Broadcasting system (DAB) and specified in the European Telecommunication Standard entitled "Radio Broadcasting Systems; Digital Audio Broadcasting (DAB) to mobile, portable and fixed receivers", ETS 300401, February 1997, the disclosure of which is incorporated here by reference, has been proposed for use in a hybrid system to support high data rate downlink channels in combination with cellular technology as specified in the pan-European standard GSM.

Broadcast systems, e.g., FM radio systems, have been used independently of cellular systems for many years. Some broadcast systems, like those designed in accordance with DAB, are also simulcast systems. In broadcasting simulcast systems, unlike cellular radio systems, the same information is broadcast to remote units by several transmitters. The set systems are useful for transmitting at high data rates because of their larger bandwidth as compared with cellular systems. However, in combining broadcast and cellular technologies there are many design issues to be addressed, in particular how a remote unit will be assigned to a broadcast network to begin receiving information over a high data rate, downlink channel.

As is well known to those skilled in the art, conventional cellular systems such as GSM and D-AMPS use many different techniques to provide a combination of high traffic capacity and high received signal quality. For example, frequency reuse is a technique which is commonly used in these systems to increase capacity. This phrase refers to reusing frequencies in cells which are separated by a distance which is sufficient (given other system design factors) so that the co-channel interference caused by simultaneous transmissions on the same frequency does not create unacceptable received signal quality at the mobile stations.

Another technique commonly used in conventional cellular systems to assist in maintaining high received signal quality is to use the mobile stations as measurement probes that evaluate signal quality on the channels which are available for communication and provide reports to the system on the measured quality parameters. This information is then used by the cellular system in, for example, deciding which channels should be used for establishing new connections, as well as handing off existing connections from one cell to another (or even within a cell).

In conventional broadcasting/simulcasting radio systems, on the other hand, the radio network is designed wherein a single frequency is used by all transmitters in a network to transmit the same information. Thus, a remote terminal simply tunes to that frequency and listens to the transmitter or transmitters to which it is geographically closest. Therefore, unlike cellular systems, most broadcast systems have conventionally not provided any mechanism for a remote station to select the network to which it will listen for downlink data.

However, one FM broadcasting system (which includes a Radio Data Service (RDS feature)) does provide a mechanism to change to an alternative frequency when the receiver experiences poor received signal quality. In this system, the receiver simply switches to a predetermined frequency with the expectation that it will continue to receive the same broadcast information with better received signal quality. The receiver does not measure to identify a particular frequency for the switch nor does it know if the alternative frequency will in fact provide acceptable received signal quality before the switch. Thus, receivers operating in accordance with RDS may experience a "ping-pong" effect as they switch back and forth between the two alternate frequencies until one of the frequencies provides adequate received signal quality.

In the proposed hybrid system described above efficient techniques for selecting a broadcast system will be important, particularly since (as shown below) the geographically closest broadcast network may not always provide the best received signal quality at the remote station. Thus, it would be desirable to provide new techniques for selecting a broadcast network that overcomes the deficiencies of conventional systems.

SUMMARY

Accordingly, it is an object of the present invention to overcome the deficiencies described above by providing techniques for selecting a broadcast network that will provide optimal downlink signal quality for a particular connection. A further object of the present invention provides techniques which enable a remote station to select one of several possible broadcast networks from which to receive information in a hybrid broadcast/cellular radiocommunication network.

A plurality of network selection techniques are described herein. These techniques use one or more of the following parameters: total power received by the remote station, power received from interfering transmitters by the remote station, useful power received by the remote station and signal-to-interference ratio, to identify an optimal broadcast network for call set-up and/or handoff.

BRIEF DESCRIPTION OF THE DRAWINGS

These and other objects, features and advantages of the present invention will be readily apparent to one skilled in the art from the following written description, read in conjunction with the drawings, in which.

DETAILED DESCRIPTION

In the following description, for purposes of explanation and not limitation, specific details are set forth, such as particular circuits, circuit components, techniques, etc. in order to provide a thorough understanding of the invention. For example, various details are provided relating to exemplary modulation and transmitting techniques. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
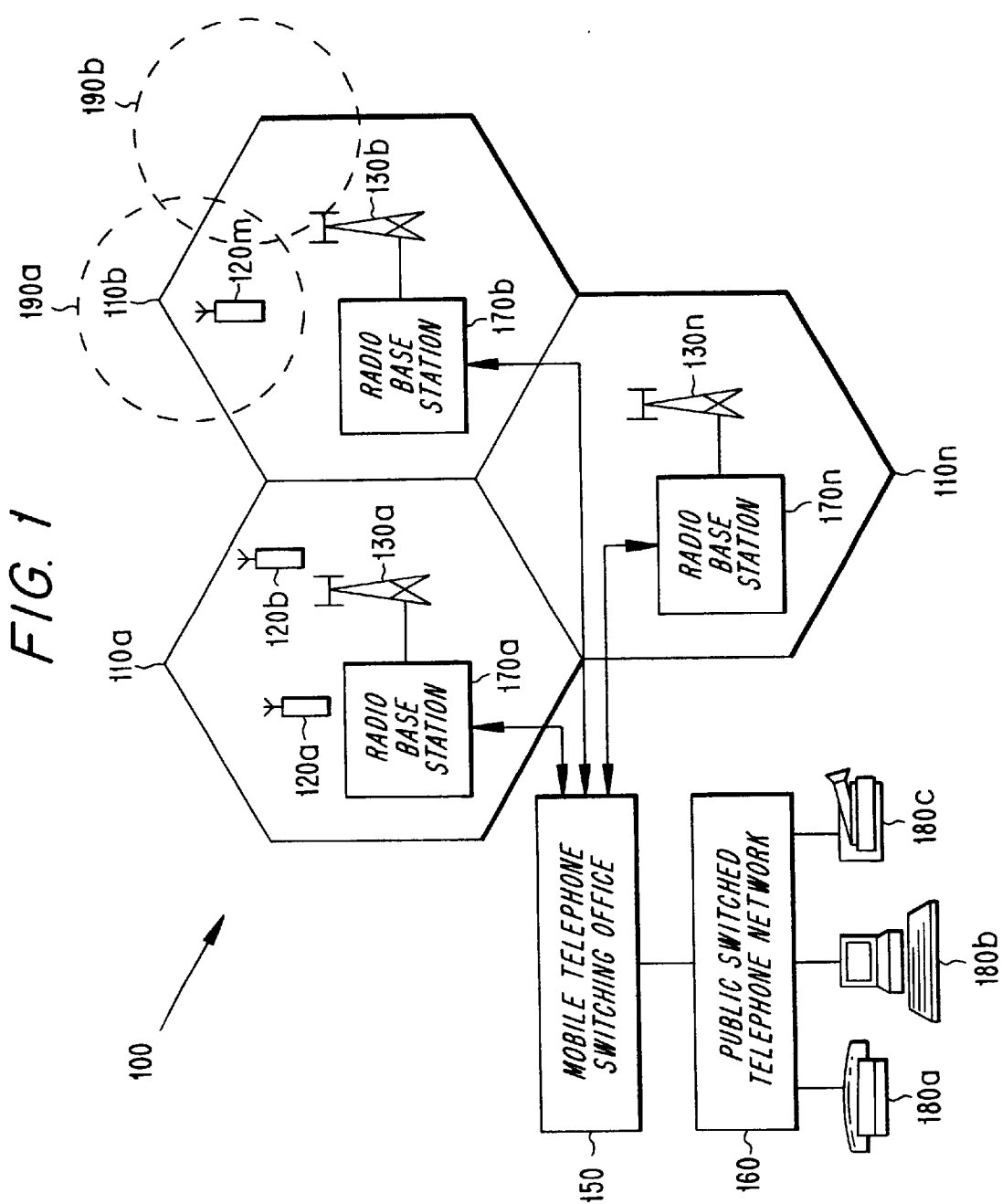
FIG. 1 illustrates a hybrid cellular/broadcast radiocommunication system.

An exemplary hybrid GSM/DAB radio communication system 100 is illustrated in FIG. 1. As shown therein, a geographic region served by the GSM system is subdivided into a number, n, of smaller regions of radio coverage known as cells 110*a–n*, each cell having associated with it a respective radio base station 170*a–n* which operates in accordance with the well known GSM specification. Those skilled in the art will appreciate that techniques and systems according to the present invention for selecting a broadcast network can also be used independently of such a cellular network or in a hybrid network in which the cellular portion is designed in accordance with other standards.

Each radio base station 170*a–n* has associated with it a plurality of transmit and receive radio antennas 130*a–n*. Note that the use of hexagonal-shaped cells 110*a–n* is employed as a graphically convenient way of illustrating areas of radio coverage associated with a particular base station 170*a–n*. In actuality, cells 110*a–n* may be irregularly shaped, overlapping, and not necessarily contiguous. Each cell 110*a–n* may be further subdivided into sectors according to known methods. Distributed within cells 110*a–n* are a plurality, m, of mobile stations 120*a–m*. In practical systems the number, m, of mobile stations is much greater than the number, n, of cells. Base stations 170*a–n* comprise inter alia a plurality of base station transmitters and base station receivers (not shown) which provide two-way radio communication with mobile stations 120*a–m* located within their respective calls. As illustrated in FIG. 1, base stations 170*a–n* are coupled to the mobile telephone switching office (MTSO) 150 which provides inter alia a connection to the public switched telephone network (PSTN) 160 and henceforth to communication devices 180*a–c*. The cellular concept is known to those skilled in the art and, therefore, is not further described here.

Also included in the hybrid system of FIG. 1 are a plurality of DAB networks. For clarity of the figure only two DAB networks, 190*a* and 190*b*, are graphically represented by the dotted circles, although more networks may be provided as necessary to supply the desired system capacity and considering other design criteria that will be readily appreciated by those skilled in the art. Moreover, although the dotted circles shown in FIG. 1 are smaller than the hexagons used to represent cells, the actual coverage area of each DAB network may, of course, be larger or smaller than that of each base station.

Figure 2:
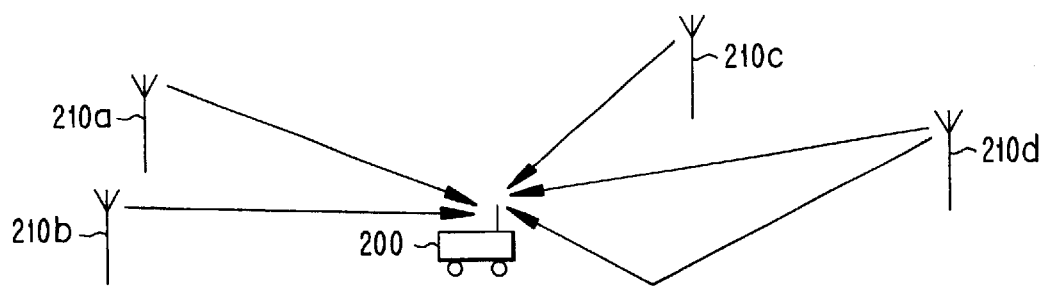
FIG. 2 depicts multipath propagation in broadcast transmission systems.

Unlike the cells 110*a*, 110*b* and 110*c*, however, each DAB network 190*a* and 190*b* will generally include a plurality of transmitters (although some DAB networks may have only one transmitter). The DAB networks 190*a* and 190*b* will preferably operate on different frequency bands to avoid interfering with one another. However, within each network, the plurality of transmitters will broadcast the same information on the same frequency band simultaneously. Thus, for example, should mobile station 120*m* be assigned to DAB network 190*a* for its downlink connection, mobile station 120*m* may receive data from a plurality of transmitters within DAB network 190*a*, depending upon various factors such as the location of the mobile station 120*m*, transmit power of the DAB network, etc. This concept is illustrated in FIG. 2.

Therein, remote station 200 is receiving signals from each of four DAB transmitters 210*a*, 210*b*, 210*c* and 210*d*. Depending upon the radio propagation path between the transmitters and the remote station, the remote station may receive one or more signal rays (echoes) from each transmitter, as conceptually illustrated by the two rays shown being received from transmitter 210*d*. The multipath propagation and signal reception associated with using a broadcast network to transmit data to the remote station is also significant as a factor in considering which network to select, as will be discussed in more detail below.

In the exemplary embodiments described herein, DAB networks are used to provide high rate downlink data to remote stations. To foster a complete understanding of techniques for selecting between broadcast networks for the purposes of, for example, intial traffic channel assignment and handoff, a basic description of DAB signal transmission is first provided, followed by exemplary receive signal quality measurements. The interested reader can find more detailed information regarding DAB signal transmissions in the above-incorporated by reference ETSI standard.

Figure 3:
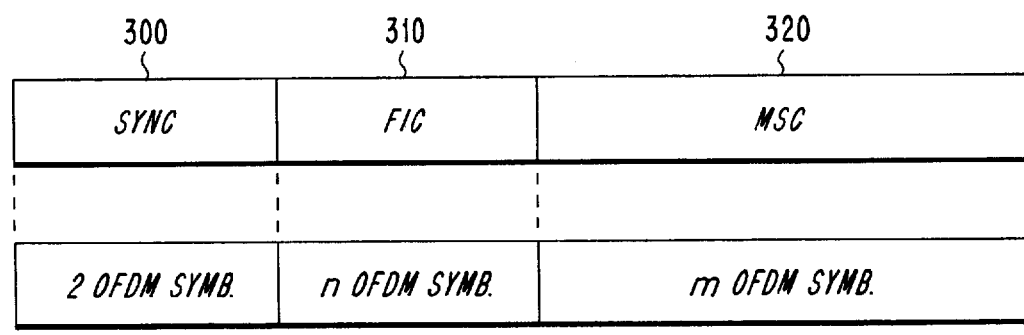
FIG. 3 illustrates an exemplary DAB frame structure.

The frame structure of an exemplary DAB signal is depicted in FIG. 3. Therein, it can be seen that each frame includes three fields. The first field 300 contains a synchronization (sync) word which is used by the remote unit to synchronize to the transmitted signal. In this case, the sync word comprises two symbols. The second field 310 is the Fast Information Channel (FIC) uses n symbols to convey information regarding the current configuration of the Main Service Channel (MSC) 320. The MSC 320 contains m symbols of payload data.

In DAB systems, this frame structure is transmitted using several OFDM (Orthogonal Frequency Division Multiplexing) signals. In an OFDM scheme, the bandwidth is divided into a large number of orthogonal, narrowband subchannels, which are transmitted in parallel. In OFDM schemes, a high data rate data stream is modulated onto a large number of these subchannels. Although the rate of the data stream is quite high, the modulation rate of each subchannel is relatively low, which makes each symbol relatively long. This, in turn, makes OFDM symbols more resistant to the effects of multipath propagation which are problematic in broadcast systems. Furthermore, an extra guard interval (an extension in time of the OFDM signal) is inserted between consecutive OFDM signals, thereby reducing the effects of the delay spread even more.

The signals on different subchannels are orthogonal in the time domain, but overlap in the frequency domain. More specifically, an OFDM signal can be defined by the following equation:

$$x(t) = \sqrt{P_{tx}} \sum_{k=0}^{N-1} D_k e^{j2\pi(f_a + k/T)t} \quad 0 \le t \le T + T_g$$

where $p_{tx}$ is the transmitted power, N is the number of carriers, $D_k$ is the information on carrier k, T is the duration of a symbol and $T_g$ is a guard interval. Thus, an OFDM signal is transmitted every $T+T_g$ second.

Figure 4:
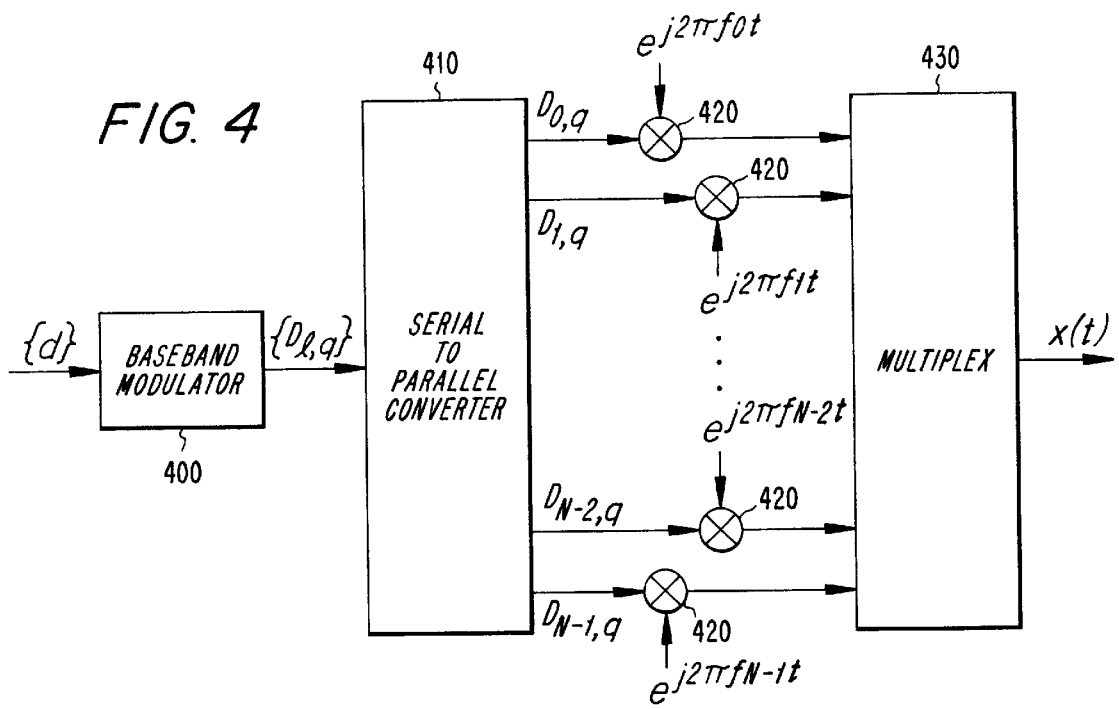
FIG. 4 is a block diagram representation of an OFDM transmitter architecture.

A block diagram representation of an OFDM transmitter which can be used to implement the present invention is illustrated in FIG. 4. Therein, the high data rate data stream to be transmitted is first baseband modulated at block 400. The modulated data is then separated into the desired number of subchannels by serial-to-parallel converter 410. Each subchannel is then upconverted to its assigned radio frequency at multipliers 420. Then, each subchannel is multiplexed together to form a composite signal x(t) for transmission.

Figure 5:
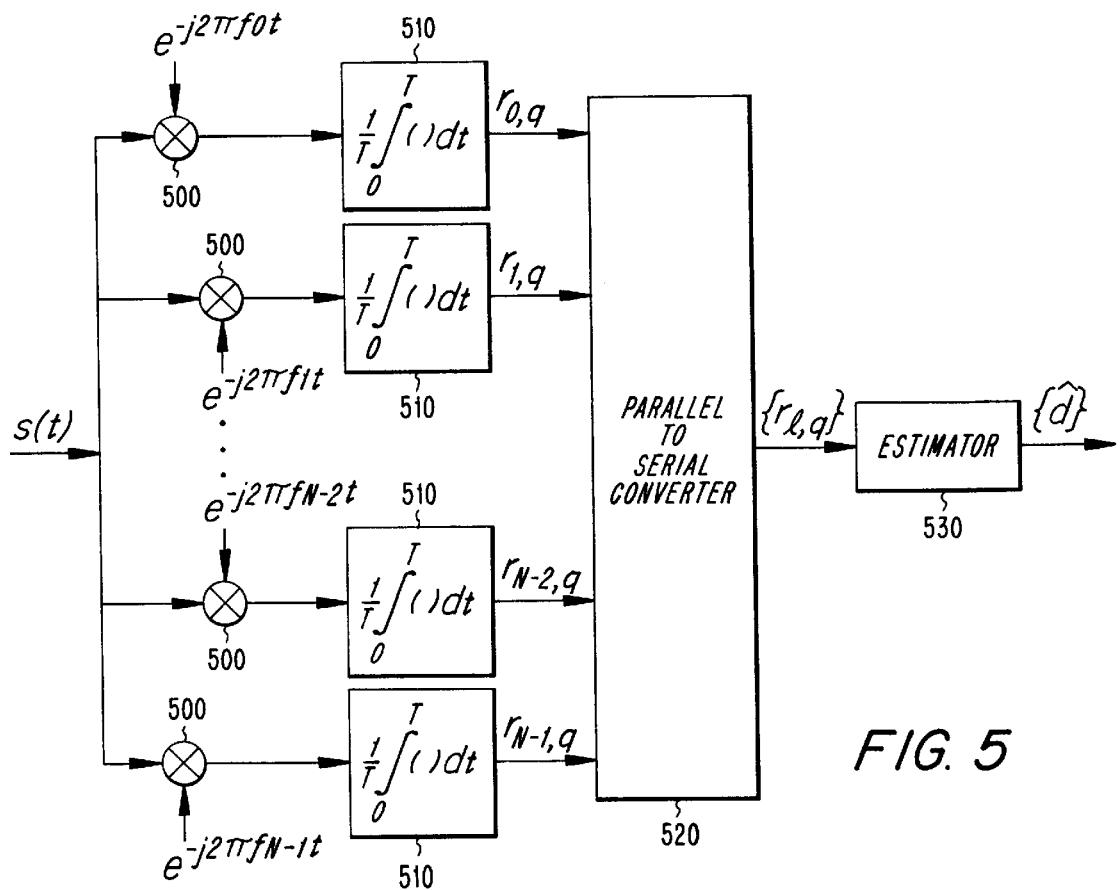
FIG. 5 is a block diagram representation of an OFDM receiver architecture.

The reverse process is applied in each remote station's receiver as illustrated in FIG. 5. The received composite signal s(t) is correlated to each subchannel frequency at blocks 500 and 510 to extract each subchannel from the composite signal. Then, a parallel-to-serial converter extracts the parallelized data stream at block 520. Lastly, symbol estimation is performed at block 530 to decode the received information symbols. Alternative implementations of OFDM transmitters and receivers can be designed using inverse Fast-Fourier Transform and Fast-Fourier Transform techniques, respectively.

In DAB systems, the sync field 300 in each frame is transmitted using two OFDM subchannels. One subchannel carries a NULL signal, which is used by the receiver for coarse time synchronization. The second OFDM subchannel is used as a reference for demodulating the received signal which, according to this exemplary embodiment, is modulated using a differential modulation scheme, e.g., differential quadrature phase shift keying (DQPSK).

Figure 6:
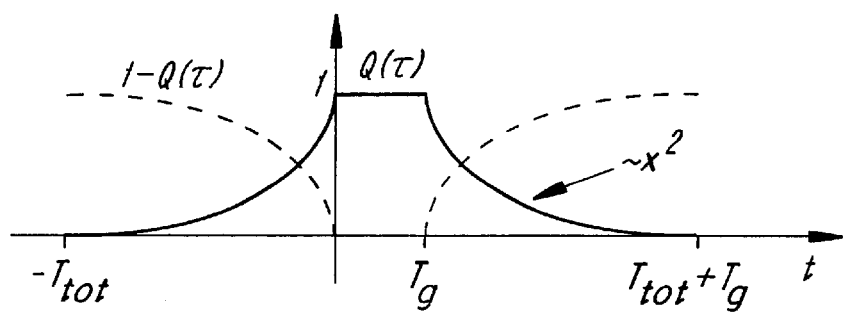
FIG. 6 is a graph depicting a weighting function used to describe the portion of received signal power which is useful given delayed OFDM signals.

As mentioned earlier, there are several differences between DAB radio networks and conventional cellular radio networks which need to be considered when determining how to measure selection criteria for DAB networks. Specifically, the simulcasting of DAB systems creates an artificial delay spread and a remote station will experience delayed OFDM signals which may overlap the receiver's detection window thereby causing interference. When a signal is substantially delayed it will not only translate into intersymbol interference (ISI), but also interchannel interference due to losses in orthogonality between subchannels. This type of interference is often referred to as self-interference, since the network itself generates its own interference. Thus, the signal-to-interference ratio (SIR) at a receiver depends on the structure of the network configuration (i.e., the propagation delays). A measure of SIR in DAB networks can be obtained according to the following formula:

$$\Gamma^j = \frac{P^j_{use}}{P^j_{self} + P^j_{ext} + N_o} = \frac{\sum_{i=1}^{N_j} P^j_i Q(\tau_i - t_r)}{\sum_{i=1}^{N_j} P^j_i (1 - Q(\tau_i - t_r)) + P^j_{ext} + N_o}$$

under the assumption that all $N_j$ transmitters within DAB network j are transmitting on all subchannels simultaneously. The total received power (including the slow fading) from transmitter i belonging to DAB network j is denoted $P^j_i$, the self interference associated with transmissions from transmitters in network j is denoted $P^j_{self}$ and Q( ) is a weighting function describing the fraction of the total received power that can be seen as useful due to the delayed OFDM signals. This weighting function is depicted in FIG. 6. The difference between the arrived signal and the time instant that the receiver starts to detect the signal is denoted $\tau_i - t_r$. Interference from other DAB networks are given by $P^j_{ext}$ and the noise level is denoted $N_o$.

According to the present invention, the remote station measures the received signal quality associated with each different DAB network that it can receive, or those identified for measurement over the control channel transmitted by the base station in the GSM portion of the hybrid system. This information can then be used to select one of the DAB networks to support the connection, which decision can be made either at the remote station or by the system if the quality measurements are reported. SIR is one parameter which can be estimated and used as a basis for network selection. However, according to other exemplary embodiments, other measurements may also be used, since estimating the SIR may be unduly complex.

Six exemplary network selection schemes are described below, where DAB network j is selected out of a set of possible networks (e.g. the seven geographical closest networks). In the methods described below it is assumed that the received power is much larger than the noise floor, i.e. the noise floor, $N_o$, is omitted:

Method I $$\arg_j \max \left\{ \sum_{i=1}^{N_j} P_i^j \right\} = j_I$$

Method II $$\arg_j \max \left\{ \sum_{i=1}^{N_j} P_i^j + P_{ext}^j \right\} = \arg\max(P_{tot}^j) = j_{II}$$

Method III $$\arg_j \max \left\{ \frac{\sum_{i=1}^{N_j} P_i^j}{\sum_{i=1}^{N_j} P_i^j + P_{ext}^j} \right\} = j_{III}$$

Method IV $$\arg_j \max \left\{ \frac{\sum_i^{N_j} P_i^j}{P_{ext}^j} \right\} = j_{IV}$$

Method V $$\arg_j \max(P_{use}^j) = j_V$$

Method VI $$\arg_j \max(SIR^j) = j_{VI}$$

Methods I and V select the DAB network from which the terminal experiences the highest total received power and highest useful received power, respectively. Method II selects the DAB network with the highest total received power including external interference. Methods III, IV and VI are SIR-based. These methods vary in computational complexity. For example, method I only requires an estimate of $P^j_i$, while methods II–IV also need a further estimate of parameter $P^j_{ext}$. Methods V and VI add still more complexity since they require an extra estimation of the relative propagation delays ($\tau_i - t_r$) between received signals.

Figure 7:
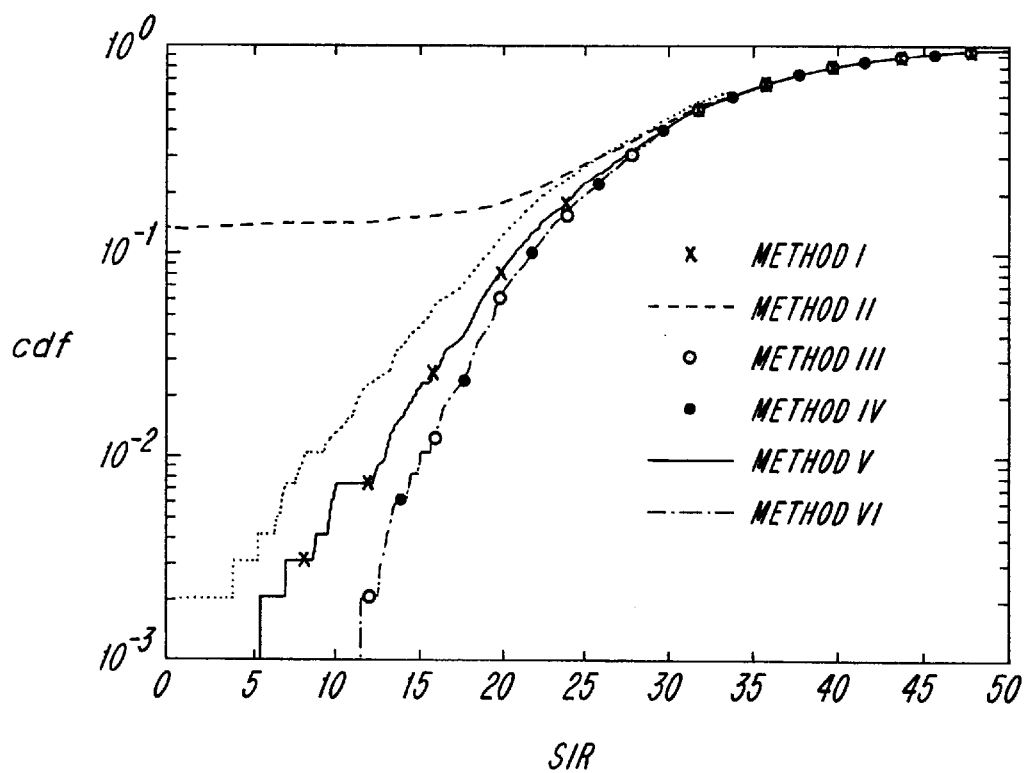
FIG. 7 illustrates simulation results for received signal quality wherein each of the six exemplary techniques for DAB network selection according to the present invention are tested and compared with a conventional technique.

Applicant has simulated each of these exemplary embodiments to determine their effectiveness in selecting among DAB networks. The results of this simulation are plotted in the graph of FIG. 7, which plots the cumulative distribution function (cdf) versus the signal-to-interference ratio (SIR) for each approach. The graph shows results for all six exemplary embodiments (although the graph resolution is such that the simulation results for methods I and V and III, IV and VI, respectively, essentially overlap one another) and, for comparative purposes, also plots results for a system where the terminal is always connected to the geographically closest DAB network (dotted line). Note that method II yields relatively poor performance as compared with selecting the closest DAB network based on, but that the other techniques all provide better performance. Methods III, IV and VI (SIR based) yield the best performance.

Next, techniques according to the present invention are presented for estimating the parameters needed to employ the selection criteria described above. One consideration used in creating these estimating techniques is that, for remote stations which are currently connected to the system (i.e., have been assigned a downlink traffic channel), the measurements not interfere with the reception of data. Thus, the DAB receiver does not make estimates when the FIC and MSC blocks are received, except with respect to that receiver's own signal. Instead, the DAB receiver uses the time period during which the NULL signal is received to make measurements used to estimate the selection criteria. During the NULL symbol, the receiver jumps to an alternative frequency of another DAB network (a list of one or more alternative frequencies can be provided in the FIC and/or can be transmitted over the control channel by the cellular portion of the hybrid system) and makes an estimate. After the NULL symbol period expires, the receiver then jumps back to the frequency on which its current DAB network is transmitting and continues to detect its data. To obtain estimates of received signal quality on its current frequency, the receiver can simultaneously detect/decode its received data and apply one of the foregoing estimation schemes.

Estimation of the parameters used in the selection criteria is less complicated if the different DAB networks have synchronized transmissions. Then, several of the proposed estimation schemes use knowledge of the structure of the DAB NULL signal (symbol) to simplify the calculations. More specifically, the NULL signal is a special OFDM signal which each transmitter within a DAB network only transmits on some of the subchannels. A unique pattern is assigned to each transmitter consisting of a set of subchannel pairs denoted as:

$$M_i^j = \{(k_{i_1}^j, k_{i_1}^j + 1), \ldots, (k_{i_m}^j, k_{i_m}^j + 1)\}$$

In this context a pair is two adjacent subchannels separated in frequency with 1/T. This construction of the NULL signals, combined with a long guard interval, reduces the self-interference and the external interference between the subchannels in the NULL signal. Thus, the subchannels do not experience the SIR as described above. Instead, the received output after correlation on subchannel k can be approximated as:

$$r_{k,NULL} \cong H_{k,NULL}^j \sqrt{P_i^j} D_{k,NULL} + n_{k,NULL}$$

where $D_{k, NULL}$ is data transmitted on subchannel k, $P^j_i$ includes all of the received powers, $H^i_{k, Null}$ is a complex path (channel) gain including the fast fading and $n_{k,\,NULL}$ is all-white gaussian noise (AWGN). Then, for the methods described above which use $P^j_i$ in the selection algorithm, this parameter can be estimated as:

$$\hat{P}^j_i = \frac{1}{2c(M^j_i)} \sum_{(k,k+1)\in M^j_i} (|r_{k,NULL}|^2 + |r_{k+1,NULL}|^2)$$

where $c(M^j_i)$ is the number of elements in the set $M^j_i$, i.e., the cardinal number of the set.

For methods described above using $P^j_{ext}$ in the selection algorithm, the same equation can be used as for $P^j_i$ above but for the subchannels that are transmitted by external interfering transmitters, i.e., other DAB networks. For methods described above in which $P^j_{tot}$ is used in the selection algorithm, $P^j_i$ and $P^j_{ext}$ can be calculated as described to yield $P^j_{tot}$. However, for the receiver's current frequency band, it is possible to obtain a better estimate on the total received power by:

$$\hat{P}^j_{tot} = \frac{1}{2(c(\{FIC, MSC\}))q} \sum_{\{FIC,MSC\}} \sum_{k=0}^{N-1} |r_{k,q}|^2$$

where the set {FIC,MSC} are all (or a subset) of the OFDM symbols that are not used in the sync field as shown in FIG. 3.

To obtain an estimate of the time difference $\tau_i - t_r$ used, for example, in methods V and VI described above, it is possible to utilize any known technique to estimate the difference between the time of arrival of the received signal and the time at which the receiver starts to detect the signal. For example, the channel correlation between two adjacent subchannels is often very high, with only a small phase shift which depends on the subchannel separation and $\tau_i - t_r$. This correlation can be expressed as:

$$H^i_{k,NULL} H^{i*}_{k-1,NULL} \cong |H^i_{k,NULL}|^2 e^{j2\pi(\tau_i - t_r)/T}$$

where * is complex conjugate. Thus, $\tau_i - t_r$ can be estimated as:

$$(\tau_i - t_r) = \sum_{(k,k+1)\in M^j_i} \frac{1}{2c(M^j_i)} \frac{T}{2\pi} \arg(r_{k,NULL} r^*_{k-1,NULL})$$

The selection of a particular network can then be performed by inserting the parameters which are estimated as described above into one or more of the selection algorithms I–VI described above to determine an optimal network for providing downlink service to a remote station.

For systems wherein the transmitters between DAB networks transmit asynchronously, there are no periods during which the remote station can safely make measurements on other DAB network frequencies without missing FIC or the MSC data. The receiver can then not measure the useful and interfering powers as described above for insertion into the selection algorithms However, it is possible to obtain an estimate by measuring the total received power:

$$\hat{P}^j_{tot} = \frac{1}{N} \sum_{k=0}^{N-1} |r_{k,q}|^2$$

and method II can then be used.

Thus, methods according to the present invention enhance capacity in radio systems which also provide high data rates in the downlink. The simulation results described herein indicate that methods III, IV and VI provide very good coverage, even for very dense networks, at a rather low frequency reuse factor. Estimation of the parameters used in these methods can be performed utilizing the existing DAB signal structure. Thus selection schemes according to the present invention provide the added benefit that they do not require any extra hardware and are easily implemented in software.

The inventive methods can be used not only for the initial setup of a connection, but also during handover procedures. For example, the estimated value on SIR is of importance to detect when it is time to make a handover. Thus, the methods discussed herein will also provide network selection schemes which can be used during handover.

The present invention has been described in terms of specific embodiments to facilitate understanding. The above embodiments, however, are illustrative rather than restrictive. It will be readily apparent to one skilled in the art that departures may be made from the specific embodiments shown above without departing from the central spirit and scope of the invention. Therefore, the invention should not be regarded as being limited to the above examples, but should be regarded instead as being commensurate in scope with the following claims including equivalents thereof.

What is claimed is:

1. A hybrid radiocommunication system comprising:
   a plurality of cellular radio transceivers for supporting data communications with a remote station, each radio transceiver being associated with a cell;
   a plurality of broadcast networks, separate from the plurality of cellular radio transceivers, for supporting downlink data communications with said remote station, each broadcast network operating on a different frequency and each broadcast network having at least one transmitter for transmitting data on a respective frequency associated with that broadcast network; and
   means for evaluating, within the remote station, each of said plurality of broadcast networks using an evaluation algorithm and selecting one of said plurality of broadcast networks for providing said downlink data communication with said remote station.

2. The hybrid radiocommunication system of claim 1, wherein said at least one transmitter transmit signals using orthogonal frequency division multiplexing.

3. The hybrid radiocommunication system of claim 1, wherein said means for evaluating determines a total power received by said remote station from each of said plurality of broadcast networks and selects a broadcast network associated with a highest total received power.

4. The hybrid radiocommunication system of claim 3, wherein said total power includes powers associated with signals from interfering transmitters.

5. The hybrid radiocommunication system of claim 1, wherein said means for evaluating determines a total useful power received by said remote station from each of said plurality of broadcast networks and selects a broadcast network associated with a highest total useful received power.

6. The hybrid radiocommunication system of claim 1, wherein said means for evaluating determines a signal-to-interference ratio (SIR) associated with signals received by said remote station from each of said plurality of broadcast networks and selects a broadcast network associated with a highest SIR.

7. The hybrid radiocommunication system of claim 1, wherein said means for evaluating determines a ratio of a total power received by said remote station from each of said plurality of broadcast networks to said total power plus power from interfering transmitters and selects a broadcast network associated with a highest ratio.

8. The hybrid radiocommunication system of claim 1, wherein said means for evaluating determines a ratio of a total power received by said remote station from each of said plurality of broadcast networks to power received by said remote station from interfering transmitters and selects a broadcast network associated with a highest ratio.

9. The hybrid radiocommunication system of claim 1, wherein said plurality of networks transmit synchronously.

10. The hybrid radiocommunication system of claim 9, wherein said means for evaluating takes measurements during a period when synchronization symbols are being transmitted.

11. The hybrid radiocommunication system of claim 1, wherein said plurality of networks transmit asynchronously.

12. The hybrid radiocommunication system of claim 1, wherein said means for evaluating comprises using a selection algorithm.

13. The hybrid radiocommunication system of claim 12, wherein the selection algorithm is $$\arg_j \max \left\{ \sum_{i=1}^{N_j} P_i^j = j_I \right\}.$$

14. The hybrid radiocommunication system of claim 12, wherein the selection algorithm is $$\arg_j \max \left\{ \sum_{i}^{N_j} P_i^j + P_{ext}^j \right\} = \arg\max(P_{tot}^j) = j_{II}.$$

15. The hybrid radiocommunication system of claim 12, wherein the selection algorithm is $$\arg_j \max \left\{ \frac{\sum_{i=1}^{N_j} P_i^j}{\sum_{i=1}^{N_j} P_i^j + P_{ext}^j} \right\} = j_{III}.$$

16. The radiocommunication system of claim 12, wherein the selection algorithm is $$\arg_j \max \left\{ \frac{\sum_{i}^{N_j} P_i^j}{P_{ext}^j} \right\} = j_{IV}.$$

17. The radiocommunication system of claim 12, wherein the selection algorithm is $$\arg_j \max(SIR^j) = j_{VI}.$$

18. The radiocommunication system of claim 12, wherein the selection algorithm is $$\arg_j \max(P_{use}^j) = j_V.$$

19. A method for selecting one of a plurality of broadcast networks for transmitting data to a remote station in a hybrid communications system, the method comprising the steps of:

broadcasting data from each of said plurality of broadcast networks using orthogonal frequency division multiplexing, wherein the plurality of broadcast networks are separate from a plurality of cellular transceivers within the hybrid communications system;

evaluating, at a remote station, each of said broadcast networks using an evaluation algorithm; and selecting one of said plurality of broadcast networks based on an output of said evaluation algorithm.

20. The method of claim 19, wherein said step of evaluating further comprises the step of:

determining a total power received by said remote station from each of said plurality of broadcast networks and selecting a broadcast network associated with a highest total received power.

21. The method of claim 20, wherein said total power includes powers associated with signals from interfering transmitters.

22. The method of claim 19, wherein said step of evaluating further comprises the step of:

determining a total useful power received by said remote station from each of said plurality of broadcast networks and selecting a broadcast network associated with a highest total useful received power.

23. The method of claim 19, wherein said step of evaluating further comprises the step of:

determining a signal-to-interference ratio (SIR) associated with signals received by said remote station from each of said plurality of broadcast networks and selecting a broadcast network associated with a highest SIR.

24. The method of claim 19, wherein said step of evaluating further comprises the step of:

determining a ratio of a total power received by said remote station from each of said plurality of broadcast networks to said total power plus power from interfering transmitters and selecting a broadcast network associated with a highest ratio.

25. The method of claim 19, wherein said step of evaluating further comprises the step of:

determining a ratio of a total power received by said remote station from each of said plurality of broadcast networks to power received by said remote station from interfering transmitters and selecting a broadcast network associated with a highest ratio.

26. The method of claim 19, further comprising the step of:

transmitting data synchronously between said plurality of broadcast networks.

27. The method of claim 26, wherein said step of evaluating further comprises the step of:

making estimates of said plurality of broadcasting networks when synchronization symbols are being transmitted.

28. The method of claim 19, further comprising the step of:

transmitting data asynchronously between said plurality of broadcast networks.

* * * * *